J. M. SEAY.
SUBSOIL PLOW.
APPLICATION FILED DEC. 7, 1911.
1,100,920.
Patented June 23, 1914.
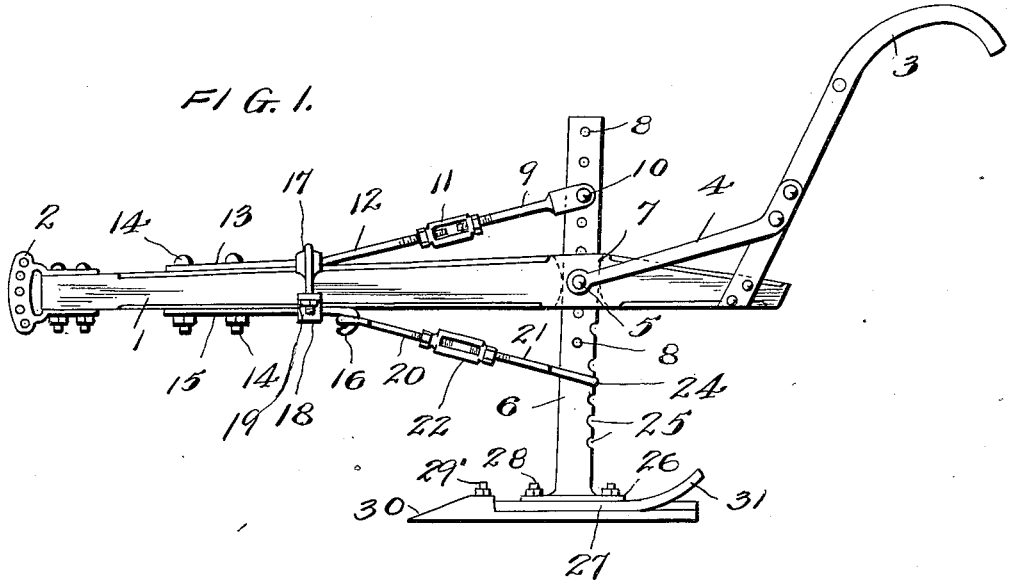
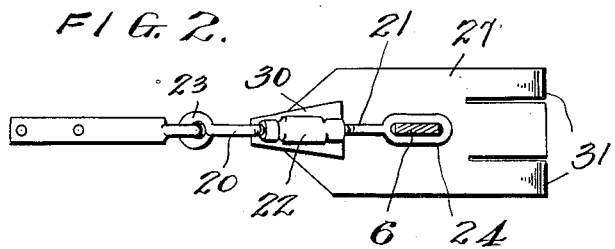
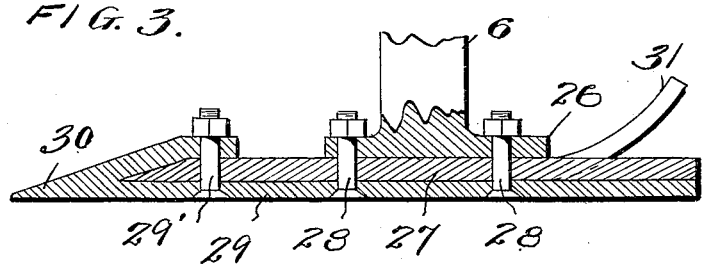
Witnesses.
C. T. Davis.
Thomas R. Harney
Inventor
Julius M. Seay
By Herman A. Phillips, atty.
COLUMBIA PLANOGRAPH CO., WASHINGTON, D. C.

UNITED STATES PATENT OFFICE.

JULIUS M. SEAY, OF CHALYBEATE, GEORGIA.

SUBSOIL-PLOW.

1,100,920.	Specification of Letters Patent.	Patented June 23, 1914.

Application filed December 7, 1911. Serial No. 664,325.

*To all whom it may concern:*

Be it known that I, JULIUS M. SEAY, a citizen of the United States, residing at Chalybeate, in the county of Meriwether and State of Georgia, have invented certain new and useful Improvements in Subsoil-Plows, of which the following is a specification.

The present invention relates to improvements in plows, and is designed especially to improve the construction of sub-soil plows.

With this end in view I have provided an implement of this character with a movable and adjustable plow standard and accompanying adjusting means, whereby the plow may be adjusted as to height for plowing at different depths, and the position of the plow share may also be adjusted with relation to the plow beam.

The invention consists essentially in devices for accomplishing the above purposes and further in novel features in the plow share, and novel combinations and arrangements of parts as will be hereinafter disclosed.

In the accompanying drawings I have illustrated one example of the physical embodiment of my invention constructed according to the best mode I have so far devised for the practical application of the principles.

Figure 1 is a side elevation of a sub-soil plow embodying the features of my invention. Fig. 2 is a plan view of the plow share, the standard being shown in section, and an adjusting device connected to the standard. Fig. 3 is a vertical central sectional view of the plow share and point.

The plow beam 1 is of usual or standard type and is provided at its forward end with the draft clevis 2, and at its rear end with the usual handles 3, from which extend the brace bars 4, attached by a bolt 5 to the beam.

The standard 6 is adjustable, and is passed through a slot 7 in the beam 1, or it may be attached at the side of the beam, in either event, the standard is pivoted to the beam by means of the brace holding bolt 5. The bolt 5 is passed through one of a series of holes 8 in the standard, spaced at regular intervals and extending from near the top of the standard, and by means of these holes and the bolt the plow may be adjusted as to its height for plowing at different depths.

For holding the adjusted standard in rigid relation with the beam I provide a securing device located above the beam and another located below the beam. The upper securing device comprises the bar 9, through which the bolt 10 is passed and by said bolt this bar is pivoted to the standard through one of the series of holes 8 therein. The other end of the bar 9 is connected by a turnbuckle 10 with a second threaded bar 12, at the end of which a flat plate 13 is formed and secured to the beam by bolts 14. The bolts 14 also serve to secure the plate or strap 15 of the hook 16 located at the under side of the beam 1 and to which the second securing device is attached. The straps 13 and 15 are further secured to the beam 1 by means of the clip 17 and under strap 18, the former being formed with threaded prongs and connected to the latter by means of nuts 19.

Between the hook 16 and the standard 7 is suspended the pair of bars 20 and 21, and these bars are threaded at their adjacent ends and connected by the turn buckle 22. The bar 20 is provided with an eye 23 by which it is attached to hook 16 and the bar 21 is formed at its end with a loop 24 surrounding the standard 6. To prevent slipping of the loop 24 on the standard, the standard, at its edge may be provided with recesses or notches 25 in which the loop is adapted to fit.

At its lower end the standard 6 is formed with a base portion 26 to which the plow share 27 is attached by bolts 28, 28. The bolts pass through the shoe or runner 29 also, and the additional bolt 29' secures the plow point 30 and the other parts together. A pair of wings 31 are curved upwardly and rearwardly from the plow share to properly dispose of the soil as the plow passes through the earth.

The construction of the plow share as shown enables me to detach the share from the standard by withdrawing bolts 28, and to sharpen the point 29' the shoe may be detached from the share by displacing bolt 29'. It will be observed that the plow point 30 is turned back from the forward end of the shoe, and the point is welded and forged to the proper degree, the shoe extending the entire length of the plow share.

From the above description taken in connection with the drawings it is evident that I have provided a sub-soil plow which fulfils the conditions requisite for a comparatively perfect implement of this character, which is durable, easy to manipulate, and inexpensive in first cost.

Having thus fully described my invention, what I claim as new and desire to secure by Letters Patent is:—

1. A plow comprising a beam provided with a vertical slot, a standard having a series of openings, a removable means for securing the standard to the beam, a share secured to the lower end of the standard, an upper bar pivoted to the standard, a second bar secured to the beam and a turn buckle connecting said bars; a looped bar engaging the standard below the beam, a second bar secured to the under side of the beam, and a turn buckle connecting said bars, whereby the standard may be tilted relatively to the beam and held in adjusted position.

2. A plow comprising a beam provided with a vertical slot, a standard having a series of openings and a series of notches in the rear edge thereof, means for removably securing the standard in the vertical slot of the beam, a share secured to the lower end of the standard, an upper bar pivoted to the standard, a second bar secured to the beam and a turn buckle connecting said bars; a looped bar engaging a notch of the standard below the beam, a second bar secured to the under side of the beam, and a turn buckle connecting said bars, whereby the standard may be tilted relatively to the beam and held in adjusted position.

In testimony whereof I affix my signature in presence of two witnesses.

JULIUS M. SEAY.

Witnesses:
A. T. Cason,
W. T. Rosser.

Copies of this patent may be obtained for five cents each, by addressing the "Commissioner of Patents, Washington, D. C."